United States Patent [19]

Bourquardez

[11] 4,050,246
[45] Sept. 27, 1977

[54] WIND DRIVEN POWER SYSTEM

[76] Inventor: Gaston Bourquardez, Vallon des Lauriers, Aix-en-Provence, France, 13100

[21] Appl. No.: 692,823

[22] Filed: June 4, 1976

[30] Foreign Application Priority Data

June 9, 1975  France .................................. 75.17859

[51] Int. Cl.² .............................................. F03D 3/00
[52] U.S. Cl. .................................. 60/398; 416/132 B; 416/240; 290/55
[58] Field of Search .......................... 60/398, 495, 720; 416/131, 132 R, 132 A, 132 B, 240; 290/55, 44

[56]  References Cited
U.S. PATENT DOCUMENTS

| 19,383 | 2/1858 | Shaw | 416/240 X |
| 2,442,783 | 6/1948 | Senn | 416/240 |
| 2,917,255 | 12/1959 | Boyd | 416/132 X |
| 3,482,803 | 12/1969 | Lindenbaum | 416/132 X |
| 3,942,909 | 3/1976 | Yengst | 416/132 B |

Primary Examiner—Edgar W. Geoghegan
Attorney, Agent, or Firm—William Anthony Drucker

[57] ABSTRACT

A wind driven power plant has a vertical axis rotor which is rigidly connected to a center body in turn connected to a rotating base. The base is supported on a fixed pylon by means of a mechanical, or preferably fluidic bearing.

The rotor blades are strongly bowed, soft in torsion and provided, near their tip region, with automatic pitch piloting means.

18 Claims, 22 Drawing Figures

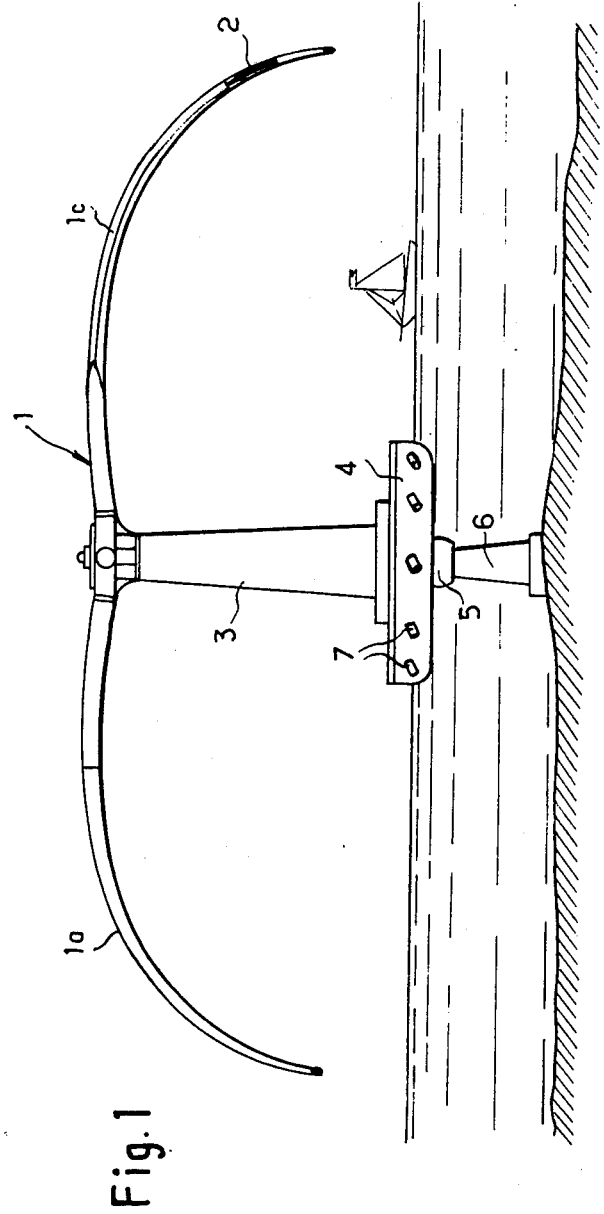
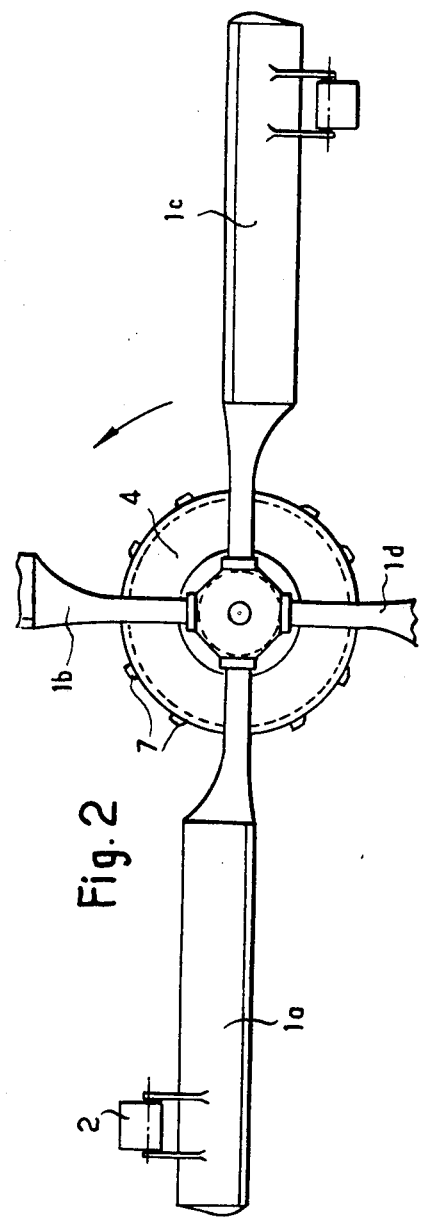

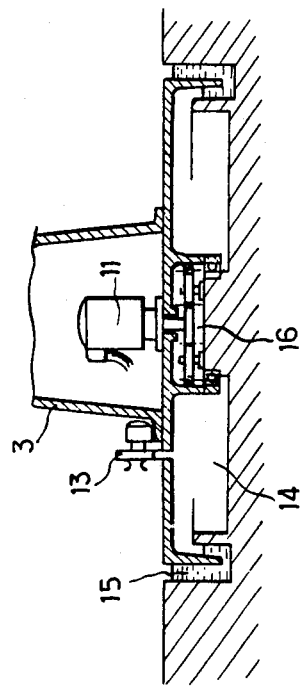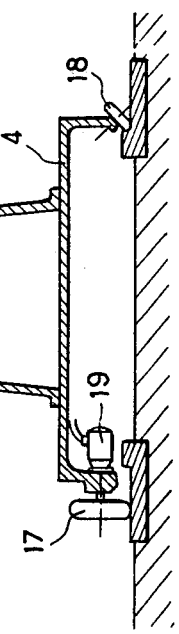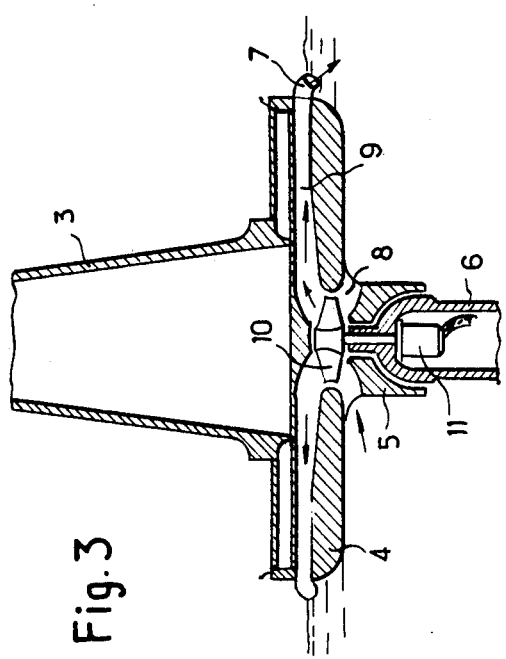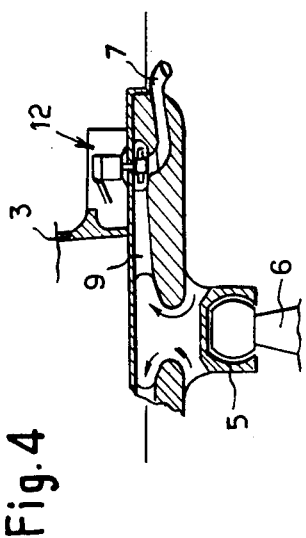

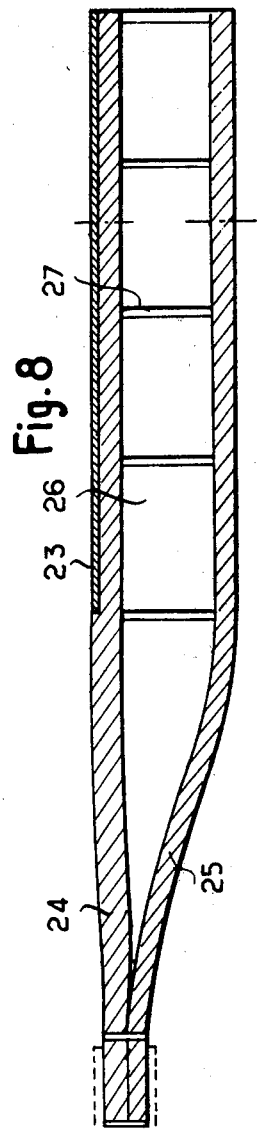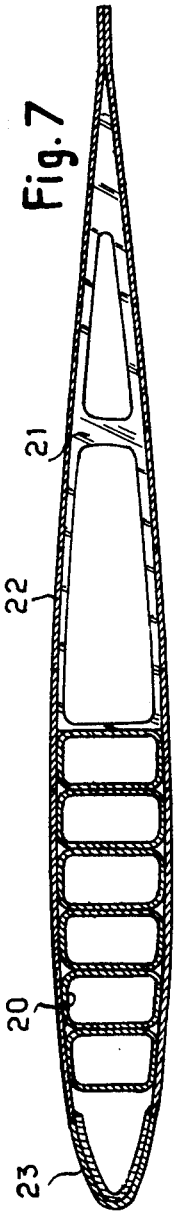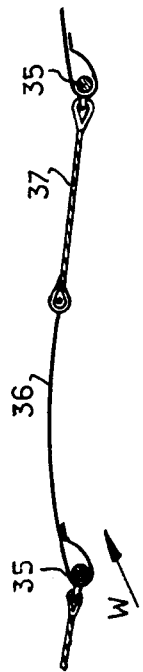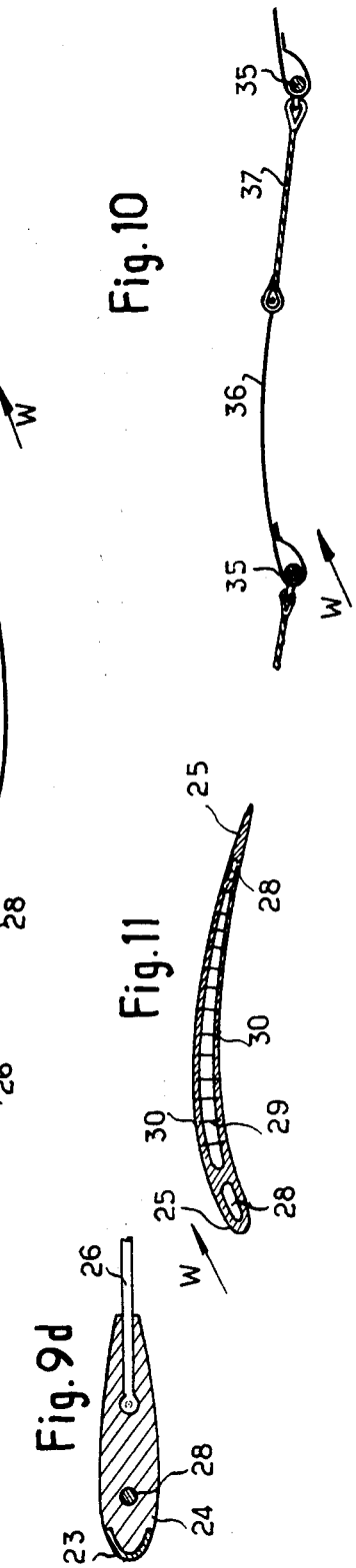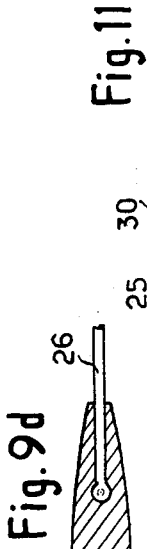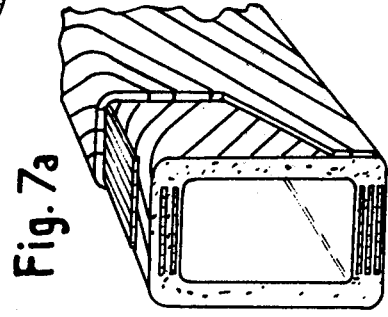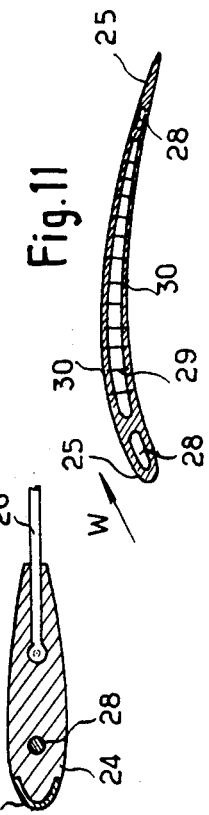

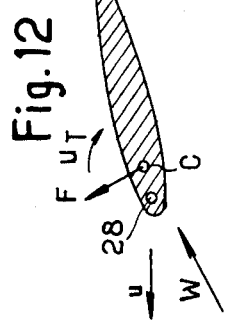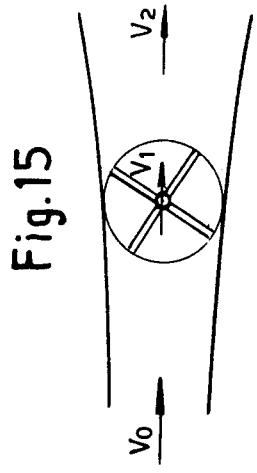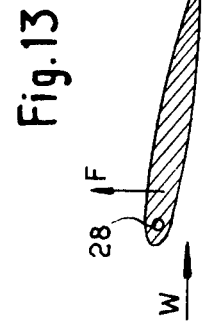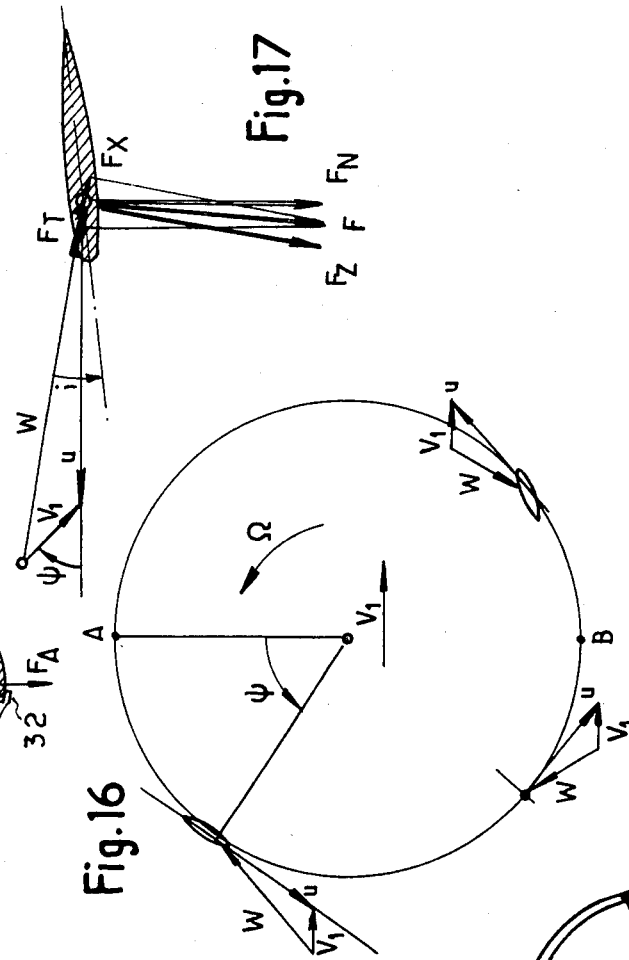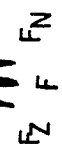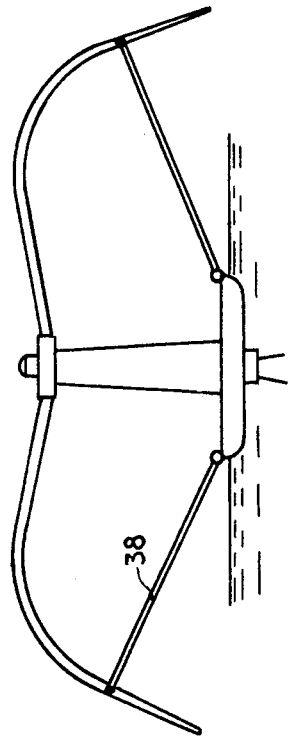

WIND DRIVEN POWER SYSTEM

This invention relates to wind energy conversion systems, and more particularly to high performance vertical axis windmills.

It is known that the advantage of vertical axis windmills is that they are adapted to operate equally well, regardless of the direction of the wind, and, therefore, need no heading device. However, the prior art vertical axis windmills did not generally reach the stage of useful application, mainly because of their poor efficiency.

For the same reason, the largest wind driven generators, delivering power up to 2 or 3 megawatts, were only built on the horizontal axis concept. However, their size remains limited. The main reason is that the blades of large diameter rotors, rotating at low speed in a vertical plane, are subjected at their root to high alternate stresses, due to high dynamic loads and in plane moments due to their own weight, leading to premature fatigue failure.

Moreover, the power conversion itself, from low speed high torque input to usable electric power needs heavy high ratio speed multiplying gearboxes, whose price, poor efficiency and high maintenance costs results for a large part in high cost of the generated energy.

Finally, very large diameter rotors rotating in a vertical plane and reaching several hundred feet in the air may constitute a danger to low altitude air traffic.

Accordingly, it is an object of the invention to provide a wind power generator, adapted to be built in the sizes needed to produce powers as large as several tens of magawatts, having an acceptable height, and making use of comparatively simple technology, due to the fact that the loads are mainly static.

It is another object of the invention to provide a vertical axis windmill, the rotor of which has a plurality of strongly bowed blades, having at least at their outermost region, a variable pitch obtained from automatic torsion.

The foregoing objects are preferably accomplished by the rigid mounting of the rotor on a base, rotating on a fluidic, pneumatic or hydraulic bearing.

According to a preferred embodiment of the invention, the base is floating on a water body, which supplies further the fluid to hydraulic power injecting means actuating electrogenerators.

A better understanding of the invention will be obtained from the following description:

In the attached drawing:

FIG. 1 is an elevational view of a preferred embodiment of a wind power plant in accordance with the invention.

FIG. 2 is a plan view of the apparatus shown in FIG. 1.

FIG. 3 is a sectional view of the lower part of the apparatus of which

FIGS. 4, 5, 6 show various modified embodiments.

FIG. 7 is a cross-sectional view taken transversely to a blade of the apparatus shown in FIG. 1, FIG. 7a is a fragmentary cross-sectional perspective view of a spar element of the blade section shown in FIG. 7.

FIG. 8 is a plan view of a modified blade construction.

FIGS. 9a, 9b, 9c, 9d are diagrams illustrating the operation of the blade shown in FIG. 8.

FIGS. 10 and 11 show other modifications of the blade construction.

FIGS. 12, 13 and 14 show various embodiments of pitch piloting devices for the rotor blades.

FIGS. 15, 16 and 17 are diagrams illustrating the aerodynamic operating mode of the rotor blades, and FIG. 18 shows in elevation a modified embodiment of the apparatus.

Referring more particularly now to FIGS. 1, 2 and 3 there is shown an example in which the apparatus has four identical blades 1a, 1b, 1c, 1c (blades 1b and 1d are only partially shown in FIG. 2).

The rotor 1, has a vertical axis and the blades are rigidly fixed by their root end at the top of a tower-shaped supporting body 3, in turn rigidly mounted on an enlarged circular base 4 adapted to float on a water surface and to support the whole rotatable system.

Diameter, weight and shape at the waterline of base 4 are established to overcome the tilting moments arising with the strongest winds.

Action of wind would also drift the system on the waterplane. To avoid that drift, base 4 bears an extension 5, acting as an universal bearing around a pylon 6 firmly anchored on the bottom.

It is to be emphasized that the wind rotor disclosed is very stable, as the base is heavy as compared to the blades and as the resultant of the aerodynamic forces exerted on the blades will act in the vicinity of the bearing means and generate low tilting moments.

The blades are connected to body 3 in such a manner that the mean chord of the blade sections remains approximately orthogonal to the rotational axis, all along the blade.

The blades are long and flexible, and bow strongly under their own weight. Their flexural rigidity is distributed along the span in such a manner that the blades, departing horizontally or with climbing slope from the centerbody top, droop progressively in a regular bow until the slope becomes downwardly directed and almost vertical at the tip region. It is the outboard portion of the blade with strong downward slope which forms the active part of the blade. j By reason of their length, the blades are also very flexible in twist and that is used to obtain a high efficiency. For that purpose each blade is fitted at its outer region with an aerodynamic means 2 allowing adjustment of the pitch of the blade cross section airfoil against the relative wind encountered by the blade while the system rotates about its vertical axis.

The bearing 5 will advantageously be designed in such a manner as to allow slight vertical and angular motions and to minimize friction, for instance by applying known techniques of fluidic bearings, the fluid being here provided by the surrounding liquid supporting the apparatus.

FIG. 3 shows that the base 4 is provided with an axial passage 8 connected to a plurality of ducts 9 having a generally radial direction, ending in curved nozzles 7 at the periphery of the base.

Through the centrifugal forces acting on the liquid contained in ducts 9, a flow is created, the liquid being sucked through passage 8, circulating through ducts 9 and being ejected outboard through nozzles 7 in the vicinity of the waterline. Thus, hydraulic power is generated in large flow, low pressure form and directly usable by a commonly known bulb type variable pitch turbine 10, driving an electrical power generator 11.

In the modified embodiment of FIG. 4, the hydraulic power is used by a plurality of units 12 each including a turbine which drives an electro-generator. These units are located in the respective radial ducts 9.

In the embodiment of FIG. 5, the base supporting the centerbody 3 is floating on an air cushion, thus reducing even more the frictional resistance to rotation. An air compressing unit 13 maintains the needed air pressure in chamber 14, which is sealed by a liquid ring 15 which acts as a bearing and further participates in the stability of the apparatus.

The power output is produced by an electrogenerator 11, driven by a speed multiplying gearbox 16, for instance of the planetary type, with the ring gear fixed on the rotating base, the shafts of the planet gears being coupled to the bottom and the sun gear being fixed on the electrogenerator shaft.

In the embodiment of FIG. 6, the base 4 is supported by a circular set of tire fitted wheels 17, while another set of wheels 18 plays the centering role assumed in FIG. 1 by the bearing 5. Some of the supporting wheels, such as 17 directly drive an electro-generator 19.

The operation of the wind power plant is explained hereinafter in detail, referring more particularly to FIGS. 15, 16 and 17.

FIG. 15 shows in plan the ideal stream tube which encloses the rotor. The given wind velocity, as undisturbed far upstream, is "$V_0$". Very far downstream, air has lost a part of its energy, and upstream pressure being restored, its velocity has slowed down to "$V_2$".

Elementary fluid theory considerations show then that the average velocity $V_1$ of the air crossing the rotor is the mean value of the upstream $V_0$ and the downstream $V_2$ velocities:

$$V_1 = \frac{V_0 + V_2}{2}$$

It must be considered here, as it is by rule done in helicopter rotor theory, that the mass flow Q interfering with the rotor is that one flowing through the sphere of the same diameter surrounding the rotor:

$$Q = \rho \frac{\pi D^2}{4} V_1$$

where $\rho$ is the specific mass of air.

Using momentum and energy conservation theorems, the action of the air thrust on the rotor is:

$$F = Q(V_0 - V_2) = 2Q(V_0 - V_1)$$

and the power which it is theoretically possible to pick up is:

$$P = F \cdot V_1$$

$$P = 2\rho \frac{\pi D^2}{4} V_1(V_0 - V_1)$$

It is known that the optimum power which may be picked up corresponds to the case of a cross speed $V_1$ which equals ⅔ of the wind speed:

$$V_1 = \frac{2 V_0}{3}$$

the value of the picked up power being then:

$$P_{MAX} = \frac{8}{27} \rho \frac{\pi D^2}{4} V_0^3$$

This formula shows that for a given wind speed large amounts of energy may only be extracted by means of very large diameter rotors.

It is obvious that the power which may actually be picked up is less than the theoretical optimum, as it is not possible to obtain uniform crossing velocity $V_1$, and as the design of the power plant will not always lead to the optimal $$V_1 = \frac{2 V_0}{3}.$$

Moreover, the really usable power also depends on the efficiency of the rotor itself, and on all of the parts transmitting or converting the energy.

The wind rotor disclosed hereinabove is designed to work very close to the best adaptation, which allows the optimal crossing velocity $V_1$ to be reached with the best possible efficiency.

As the output power is obtained with minimum number of intermediate parts, it finally results that the overall efficiency will be near the optimum.

To simplify, these will be considered only an outboard part of the blades arranged vertically. It is to be understood that for an actual blade part which is not vertical, the operation will be quite similar, but the real radius of the turning circle and a different composition of velocities for wind and blades shall be considered, taking account of the projections of the actual velocity vectors on a plane perpendicular to the blade element.

The aerodynamic performance of the rotor is computed by integrating the elementary actions on each blade element, which calculation will then enable one to adjust the blade area to approach the optimal crossing velocity $V_1$.

FIG. 16 shows how the real velocity u of the blade element, while rotating in the trigonometric direction viewed from above, composed with the crossing wind velocity $V_1$, resulting in a relative wind velocity W, which is to be considered in the action of air on the airfoil formed by the cross section of the blade element.

At point A, taken as the origin of the circular path, $V_1$ is opposed to u, and the resulting velocity W is directly opposed to u, with the highest possible value.

At point B, diametrically opposed to A, $V_1$ has the same direction as u, and depending on the fact that u is larger or smaller than $V_1$, the relative wind will come from ahead or from the back of the airfoil, respectively.

In the upstream area, where the blade runs from A to B, the wind $V_1$ blows from the right side of the blade, and the relative wind W is incident from the right side on the airfoil.

In the downstream area, the blade running from B to A, the wind $V_1$ blows from the left side, and the relative wind W is incident from the left side of the airfoil, with the same angle and value as in the symmetrical position.

It is thus obvious that any blade section should be symmetric by construction and in its mode of operation.

In practice however, the blade running in the downstream area will encounter a somewhat wind $V_1$ and the wakes of the upstream running blades, and slight corrections of shape or pitch may be needed.

The operation of the considered blade element can then be closely compared to the operating mode of a sailboat, which, when sailing in straight line with a given velocity "u", would receive a wind of velocity "$V_1$", regularly turning clockwise with the same angular velocity $\Omega$ as the rotor.

It is known that in these conditions, the driving by the wind is effectively possible, excepting when the wind comes from a limited front sector and has only a retarding action.

When velocity u is smaller than $V_1$, the relative wind travels across all sectors, and the boat will sail with the relative wind turning continuously around.

When velocity u is greater than $V_1$, the relative wind will never come straight from behind, and it will only oscillate from one to the other side through the front, but it will be on the whole stronger than in the case previously mentioned.

However, if u would become very much greater than $V_1$, the relative wind W would only oscillate in the front sector, with no possible propulsion.

It is thus conceivable that an optimum $u/V_1$ ratio will exist, for which a maximum propulsion or power extraction will be obtained for a given blade element area.

It has been seen above that the maximum producible power for a given wind speed depends only from the rotor diameter, so that the proper choice of the best ratio $u/V_1$ will simply lead to the lowest necessary blade area.

It will always be possible, account being taken of other considerations, to choose another, generally lower $u/V_1$ ratio, the non optimum propulsion being balanced by a larger blade area or a better blade efficiency.

In the same manner as, on sailboats, the sails are trimmed to match with the wind direction, on the blades the aerodynamic pitch adjusting means 2 will have automatically to trim the angle of attack of the airfoils to the actually encountered local wind conditions.

Though only one adjusting means 2 is shown on FIG. 1, it is to be understood that several adjusting means could be arranged on a same blade to trim locally at best each region of the blade, or even that the blade itself could be designed for self adaptation to local conditions.

The adjusting means 2 may be built according to a variety of shapes and have different operating modes, either aerodynamical, mechanical, gravitational or inertial.

Mainly, all automatic trimming means utilized in sail navigation may be used, as for instance supple cloth sails spread out between stiff elements or ropes.

FIG. 10 shows an example in which each blade is essentially formed by a single spar 35, to which is attached by known means a soft surface 36 acting as a sail, this surface being stretched by straps 37 arranged along the free side and joining it to the corresponding spar 35 of the following blade, in such a manner as to maintain the general shape of the wind rotor.

FIG. 11 shows a more elaborate example of a supple blade cross section in airfoil shape, having at the nose and rear ends two structural spars 25, joined by two outer skins 30, the thickness distribution of the blade being kept by a transversely rigid core 29. The skins 30 consist of flexible and slightly extensible sheets of rubber, neoprene, polyurethane or the like.

The whole section may thus take by wind action a variable curvature, as will be explained hereinafter, with reference to FIGS. 9a, 9b, 9c.

FIGS. 8, 9a, 9b, 9c and 9d, the latter being an enlarged partial view of FIG. 9a, show in plan and cross section another type of blade provided with automatic trimming.

The function of the aerodynamic means (2, FIG. 2) is then performed by the whole blade itself, which is then optimally adapted at each point thereof.

As shown in FIGS. 8, 9a, 9b, 9c, and 9d the blade comprises two structural spars, each having a general aerodynamic cross-section, the main spar 24 being provided with an abrasion strip 23 forming the leading edge of the airfoil and the other spar 25 forming the trailing edge.

A flexible membrane 26 is attached to the two spars, reinforced if needed by flexible transverse spacers 27 secured to one or both of the spars.

More precisely, the membrane 26 is attached at the inboard edge of the spars, whose twist axis 28 has to lay fairly outboard, as illustrated in FIG. 9d as regards the leading edge spar.

By the action of the relative wind, the flexible membrane 26, which is normally transversely flat, will bend opposite to the incident wind W, twisting the spars about their twist axis 28, the whole blade taking then the general shape of a thin curved airfoil.

It is a known fact that this type of airfoil demonstrates very good aerodynamic qualities, associating high lift coefficients to a high lift/drag ratio.

The local transverse rigidity of the membrane and of the spacers 26, and the torsional stiffness of the spars are designed to give the optimum curvature distribution.

Moreover, the bending stiffness of the trailing edge spar 25 may be matched to the stiffness of main spar 24 in such a manner that the whole airfoil will take the most efficient angle of attach against the incident wind W.

Nevertheless, such simple trimming means cannot easily be adapted optimally to all working conditions.

Indeed, it can be shown that the law which determines the optimum angle of attack is not directly related to the aerodynamic thrust, and that the highest tractive force and, consequently, the highest efficiency will be obtained when the angle of attack value is near to that one leading to the best lift/drag ratio of the airfoil.

The corresponding pitch piloting law is then a simple one, but not related to aerodynamic forces: on each of the upstream and downstream areas, the angle of attack against the relative wind W remains practically constant and near the value corresponding to the best efficiency, the chord pointing inside on the upstream path, outside on the downstream path, and the section swinging from one side to the other in the vicinity of the transition points A and B.

A law of that kind may be obtained for instance, as illustrated in FIGS. 13 and 14, by means of movable flaps hinged at a distance at the rear of the blade section. In the example shown in FIG. 13, the flap is hinged freely and assumes two different positions, defined by stops 32, according to whether the relative wind is incident from the one or the other side.

In the same manner that an airplane tail stabilizer keeps practically constant the main wing setting, that kind of bistable flap will keep almost constant the angle of attack of the blade outer portion, on current path, and makes it swing from one side to the other with incidence inversion in the vicinity of points A and B, according to the previously mentioned law.

A piloting means even more rational and easy to adapt to various circumstances, as starting, speeding up or adaptation to variable power demand, it provided when the flap 34 is operated, as shown in FIG. 14, by means of a hydraulic, electric or electro-hydraulic servo-jack 33, remotely controlled by a central auto-pilot, not shown.

Advantageously, such as auto-pilot will consist of a computer, picking up informations from various sensors giving positions, speed, accelerations, wind heading and velocity, and transmitting orders to the jacks for continuously controlling the action of the flaps, so as to obtain at every time the highest available power of the apparatus.

Auto-pilots of similar functions are currently in use on aircraft. They are nowadays very light, safe and reliable, and comparatively inexpensive for large power-plants.

Such computerized piloting systems will completely free the blades from the structural constraints which are related to structural piloting means.

It is then possible to design the blades only having in mind the purpose of obtaining a high structural efficiency, allowing for instance the design of very long blades, the torsional stiffness of which will always be small enough to allow the needed pitch control.

FIG. 7 illustrates the cross section of such a long blade, essentially consisting of a spar 20, composed of a plurality of thin walled tubular elements of substantially rectangular cross section, assembled side by side.

The tubular elements are obtained by a filament winding process on known machines utilizing strips made of unidirctional fibers reinforced with thermo-curing resins.

Some of the strips are layed out side by side in a generally helical arrangement, others forming several right and left running helical layers, so as to provide cohesion and some torsional stiffness. The other strips form lengthwise running unidirectional rows arranged between or outside the helical layers, and providing the desired spanwise bending stiffness. An example of this lay up is clearly shown in FIG. 7a.

The strip material will advantageously consist of glass fiber epoxy composite. However any other reinforcing fiber, such as high strength or high modulus graphite, or a polyamide, may be used, according to size and desired rigidity and strength.

The above disclosed tubular elements will be made through a continuous process, either in full length of the blade, or in shorter portions fitting one in the other, to restore the full length of the blade, and withvariable height allowing an adjustment of the thickness and the stiffness of the blade along the span.

To complete the blade structure, spaced transverse ribs 21 of usual aircraft construction are secured at the rear of spar 20, supporting the aft shape of the airfoil.

The skin of the blade, forming the aerodynamic surface, is made of sandwich panels 22, secured to the spar and the ribs. In the front, the leading edge is protected from rain erosion by a stainless steel strip 23, or by a polyurethane strip, also protecting the blade against sand abrasion.

The wind power plant illustrated in FIGS. 1 and 2 has sufficiently large blades, so that centrifugal forces are low and do not noticeably disturb the bending shape given by the gravity forces.

But the invention applies also to blades of smaller sizes, and in that case, the tip speed/wind speed ratio remaining almost unchanged, the rotational speed is increased, and the centrifugal forces surpassing then the gravity forces may alter in a disturbing way the bending shape of the blades.

Therefore, smaller wind rotors will bear binding members 38, joining the blades to the base, as shown in FIG. 18, or to the center body, so as to restrain the flexural freedom of the blades. A similar result is obtained by tying the blades one to another.

The binding members 38 may take the form of rigid struts with low drag cross section, supporting either in traction or in compression the thrust variations of the blades. Also, they may be shaped as tension cables concurring to bend the blades in the same manner as a blow is bent by its stretched string.

Those cables need not be inextensible, as elastically stretchable cables may be useful by not overloading the blades.

What is claimed is:

1. A wind driven power system having a rotor rotating about a vertical axis and power generating means operatively coupled to said rotor, said rotor having at least one blade, said blade being bowed in a vertical plane and torsionnaly soft along the full length thereof and provided with means for varying the pitch thereof according to a predetermined cyclic law of variation which has a frequency of pitch variation equal to the frequency of rotation of the rotor.

2. A wind driven power system according to claim 1, wherein said blade has a flexural rigidity which is distributed along the span thereof between a root portion in the vicinity of the rotation axis and a tip portion remote from said rotation axis, said root portion being substantially horizontal or having an ascending slope, whereas the tip portion is substantially vertical.

3. A wind driven power system according to claim 2, wherein the cross-section of said blade has the shape of an aerodynamic airfoil, with a torsion axis laying ahead of the aerodynamic center.

4. A wind driven power system according to claim 2, wherein at least one flap is associated with each blade, said flap being located at the rear portion, of said blade and movable about a hinge parallel to the span of said blade.

5. A wind driven power system according to claim 4, wherein said flap is hinged freely between first and second stops which respectively define first and second positions of the flap on the respective sides of said blade.

6. A wind driven power system according to claim 4, further comprising means formonitoring the position of said flap as a function of at least one of the operational parameters of the system.

7. A wind driven power system according to claim 2, wherein the chordwise curvature of the cross-section of said blade is variable.

8. A wind driven power system according to claim 7 wherein each blade comprises two spars and a flexible membrane secured between said spars, each spar having an airfoil like cross-section.

9. A wind driven power system according to claim 8, wherein said membrane is reinforced by means of flexible rods transversely arranged with respect to the blade.

10. A wind driven power system according to claim 7, including a plurality of blades wherein each blade comprises a main frontal spar and a flexible sheet attached at one side to said spar, at least at the outer portion thereof said sheet having an opposite side and being chordwisely bent under wind action, and means for stretchedly attaching said sheet between said main spar and the corresponding main spar of an adjacent blade, said attaching means being located along the said opposite side.

11. A wind driven power system according to claim 3, wherein each blade comprises: a spar; a plurality of transverse elements completing the cross-sectional shape of the blade; an outer skin made of shaped panels of sandwich like construction forming at least part of the border of the blade cross-section; and an abrasion strip on the leading edge of the blade; said spar comprising a plurality of longitudinal tubes of substantially rectangular cross-section, said tubes being assembled side by side and each formed of longitudinally arranged strips and of helically arranged strips, said strips being made of unidirectional fibers impregnated with a thermosetting resin.

12. A wind driven power system, according to claim 1, further including a vertical rotor supporting body having an enlarged base floating on a fluid allowing rotational motion thereof, other motions of the base on the fluid being restricted through bearing means cooperating with anchoring means.

13. A wind driven power system, according to claim 12, having a plurality of blades and further including binding means connecting said blades to said base.

14. A wind driven power system, according to claim 12, wherein the said fluid is water and wherein said base is provided with an axial passage having an inlet located under the water line of the base, and with a plurality of radial ducts communicating with the axial passage and ending in curved nozzles each having an outlets in the vicinity of the outboard of said base.

15. A wind driven power system according to claim 14, wherein a hydraulic turbine driving an electro-generator is located in said axial passage.

16. A wind driven power system according to claim 14, wherein a plurality of independently operating turbine driven electro-generators are located in said radial ducts.

17. A wind driven power system according to claim 12, wherein said fluid is a pressurized gas forming an air cushion under said base, in a chamber formed between said base and a firm ground surface, and a sealing liquid ring sealing the said chamber.

18. A wind driven power system according to claim 1, wherein the rotor is rigidly connected to a vertical supporting body having an enlarged base which is rotatably mounted on a firm ground surface through a circular row of carrying wheels, a further row of centering wheels guiding said base on a circular track on the ground surface.

* * * * *